US011119448B2

(12) United States Patent
Lienau (10) Patent No.: US 11,119,448 B2
(45) Date of Patent: Sep. 14, 2021

(54) FAUX SOLAR-DRIVEN CLOCK

(71) Applicant: Richard Michael Lienau, Pecos, NM (US)

(72) Inventor: Richard Michael Lienau, Pecos, NM (US)

(73) Assignee: Richard M. Lienau, Pecos, NM (US)

( * ) Notice: Subject to any disclaimer, the term of this patent is extended or adjusted under 35 U.S.C. 154(b) by 174 days.

(21) Appl. No.: 16/010,656

(22) Filed: Jun. 18, 2018

(65) Prior Publication Data

US 2019/0384229 A1    Dec. 19, 2019

(51) Int. Cl.
| | |
|---|---|
| *G04D 7/00* | (2006.01) |
| *G04B 49/00* | (2006.01) |
| *G04G 99/00* | (2010.01) |
| *G04G 21/02* | (2010.01) |
| *G04G 15/00* | (2006.01) |
| *G08B 29/18* | (2006.01) |

(52) U.S. Cl.
CPC .............. *G04D 7/003* (2013.01); *G04B 49/00* (2013.01); *G04G 15/006* (2013.01); *G04G 21/02* (2013.01); *G04G 99/003* (2013.01); *G08B 29/185* (2013.01); *Y02B 20/40* (2013.01)

(58) Field of Classification Search
CPC ........ Y02B 20/40; H05B 47/16; G04D 7/003; G04B 49/00; G04G 99/003; G04G 21/02; G04G 15/006; G08B 29/185; G08B 15/002; G04F 1/005

See application file for complete search history.

(56) References Cited

U.S. PATENT DOCUMENTS

| | | | | |
|---|---|---|---|---|
| 4,253,169 | A * | 2/1981 | Salah | G04G 9/0064 368/15 |
| 5,933,625 | A * | 8/1999 | Sugiyama | G06F 1/14 713/503 |
| 6,680,877 | B1 * | 1/2004 | Lienau | G04G 3/00 33/269 |
| 2012/0143383 | A1 * | 6/2012 | Cooperrider | H02J 13/0079 700/295 |
| 2012/0262069 | A1 * | 10/2012 | Reed | H05B 47/105 315/130 |
| 2016/0212832 | A1 * | 7/2016 | King | H05B 47/16 |
| 2017/0055324 | A1 * | 2/2017 | Reed | H05B 47/16 |

* cited by examiner

*Primary Examiner* — Michael C Zarroli (57) ABSTRACT

An electronic visible light sensor is employed to detect the presence or lack of sunlight. The simple, digital light/dark data from the sensor is fed to electronic circuits which control security and other devices dependent upon day and night status. These circuits are directed and controlled in turn by associated electronic circuits that gather data which measures the length of the solar night, that is, between dusk and dawn, and by deduction, the length of the day. Given that these time periods vary daily and in a regular fashion, the result will necessarily differ by a few minutes each and every day during the 365 day solar year. The resulting day/night time data is used to estimate, with say, a four to ten minute accuracy, taken against the Universal Coordinated Time System, to establish start/stop times, durations and cycles of security and other devices dependent upon the presence or lack of sunlight relative to UCT designated within the universally accepted twenty-four day. These results are fed to the security control circuitry to define control of data to security and other devices.

5 Claims, 9 Drawing Sheets

FAUX SOLAR-DRIVEN CLOCK

BACKGROUND OF THE INVENTION

1. Field of the Invention

The present invention relates to electronic premise security, surveillance and annunciator systems.

2. Description of the Related Art

Security systems, primarily those made up of, and driven by, electronic circuitry as well as simpler, purely electrical (non-electronic) circuits, have become ubiquitous throughout the world, especially in well nations in the so-called "Western" model. They are intended, for the most part, to announce, in some fashion, the intrusion of a premise, i.e., a building of some description, whether private, as in a human-occupied dwelling place, or a business establishment. Related to these are surveillance, annunciator and control systems which operate automatically. In the first case, it is considered desirable to either warn away potential trespassers, burglars or attackers, and/or notify local or distant monitors of such a trespass with the expectation, or hope, of capture of the person or persons who attempt such trespass; although some trespass might occur innocently by a human or an entity other than human, such as a large animal. In the latter case, annunciator systems are used to monitor the presence of unwanted creatures, or in a more sophisticated, alternative application, the care and feeding of humans and animals. Security, surveillance and annunciator systems are useful in a myriad of applications. Some of those applications have an important, even vital, relation not only to the calendar date and time of day, but daylight and nighttime conditions.

Since the latter is often true with certain applications, this invention is designed to meet those needs. UCT ignores the solar cycle, therefore an application that requires a relationship to daylight or the dark of night, i.e., so-called solar time, a system that operates without a direct relationship to solar time must be adjusted often to compensate. For example, if a business uses a lighted sign whose operation is best between say, sundown and ten PM, a non-solar related system must be adjusted several times during the year to compensate for the daily shift in sunrise and sunset times. Such a consideration is applicable to animal husbandry; for example, in the feeding and milking of cows. Any number of examples may be given for solar-related timing episodes.

To reiterate, although the world, for the most part, relies on the so-called Universal Coordinated Time system, the daily shifting cycle of the sun is out of synchronization with said UCT; yet there can be a dependancy upon the solar cycle; that is, day or night time. A simple example of that relationship outside of the UCT is dusk-to-dawn safety lighting, which is, more often than not, driven by the appearance and disappearance of sunlight. Together with the common use of electrical and electronic devices to effect such a use, there can be a need to coordinate the shifting solar cycle with the relatively "fixed" UCT.

The Faux Solar Clock is based on the ever changing dusk-to-dawn (or the corollary thereof) solar, or sun, cycle by measuring the dusk-to-dawn time over each twenty-four hour period, then dividing it in half to determine approximate midnight, subsequently using that data to control the start and stop of output security/safety control data that more resembles that from a UCT source. The system takes into account its position on the surface of the earth relative to the nearest of the twenty-four (24) major longitudinal lines established against zero near Greenwich, England. It then emulates, by calculation, the approximate UCT time. Precise clock time is unimportant; rather the important issue is the control of devices relative to either side of midnight.

Although the Faux Clock is unable to accurately replicate UCT, it is generally within a few minutes of local UCT; nor is it intended to be. This factor, in the case of a related security system, might be considered an advantage, in that it might serve to confuse someone observing, i.e., "casing," a premise into thinking that the system is human-controlled, and therefore unreliable as a burglary or robbery target, thus a potential safety factor in and of itself.

The electronic Faux Clock embodiment described herein is an obviously fundamental design, in that it employs circuitry consisting of active integrated circuits (ICs, which include, in the main, the ubiquitous transistor), along with passive resistors, capacitors and the like.

The system can also be embodied using existing, easily acquirable programmable microprocessor integrated circuit technology. Such design could emulate that revealed herein, in that it could used as the basis for the system commands the solar cycle in the same manner, i.e., longitudinal deviation and sunrise-sunset data.

Such an alternative electronic system, as well as the system described herein, could also employ a "look-up" table system. In this case, the user would load the local daily sunset and sunrise tables taken against the actual calendric date to determine sunset and sunrise. Although an insignificant effect, any deviations caused by say, cloudy weather, would be ignored.

SUMMARY OF THE INVENTION

A light/dark sensor is placed in a strategic location; usually inside a premise against the glass of a window; that window preferably facing north (in the northern hemisphere). The sensor detects the ambient exterior light, presumably sunlight. At dusk, in this representation, the output is triggered "on." At the same time, a four (4) minute digital Night Clock starts (four minutes to represent each degree of longitude from Greenwich, England; e.g., 360° of longitude×4'=24 Hrs). The Night Clock begins counting at dusk and stops at dawn, thus measuring the duration of the night in four-minute steps, taken against longitudinal degrees of earth rotation.

When the Night Clock stops counting, the 4-bit digital Day Clock begins counting. This clock has a period between control pulses of approximately 1 millisecond. A Clock Sequencer circuit then divides the previous night's data in half and sends it to a buffer in preparation for using the count data in the up-coming dusk-to-dawn period. These data are then available, along with data available from the M Time/Float switches, fed to the Adder/Substracter 2 to determine the Output stop time, should that be the choice of the user.

There are four (4) modes of operation:
1) Output "off" at a fixed time before midnight;
2) Output "off" at a fixed time after midnight;
3) Float, or a fixed "on" duration that "floats" with dusk;
4) Dawn to dusk Output, then "off" at dawn (as with available devices).

The M Time/Float switches are used to set a fixed Output duration either before or after midnight. If, for example, the desired "off" time is ten PM (2200 Hrs UCT), the switches are set to a binary equivalent of two (2) hours in 4 minute binary steps; thus, decimal 30, the number of 4 minute portions of a two-hour time period, becomes 11110 in binary, and the Add/Subtract switch set to Subtract. Assume the desired "off" time to be say, 2 AM (0200 Hrs UCT), the same binary code would be set into the switches, but the Add/Subtract switch would be set to Add. Therefore, if the Off time desired is 10 PM, and dusk began at 7 PM (1900 Hrs UCT), 2 hours will be subtracted from the "split" number, giving a result of a 3-hour "on" time, from 7 PM to 10 PM, plus or minus a few minutes. This example would be for a Spring day at say, 35° north. Likewise, a dusk time of 8 PM (2000 Hrs UCT), would yield an output "on" time of roughly 2 hours.

An essential part of factoring "solar time" vs. UC Time is the position of the system on the earth; that is, relative to the universal standard of longitude (latitude is irrelevant, although the distance in time and distance between longitudinal degree lines shrinks the farther north or south the system is from the equator). For example, each major 15° longitudinal line represents a distance of one UCT hour from the major 15° lines on either side. It would be rare for a Faux Clock device to be directly on such a line. Because of that, in order to increase the accuracy of the system, there is a manner in which the deviation, east or west, from a major line can be entered into the system to compensate for such an offset. This means that if a Faux system is say, 1° west of a major 15° line, the offset number of 4 minutes (4' per degree) would be added to represent "true" midnight that falls on a 15° line for that position. This is accomplished with a second set of binary Deviation switches, the value of which are added to, or subtracted from, the results from the Solar Counter. The switches may be set in either direction, depending upon the proximity, east or west, of the major line through the use of the Add or Subtract switch for that function.

BRIEF DESCRIPTION OF THE DRAWINGS

In order for the invention to be more thoroughly understood, a more particular description of the embodiment of the invention described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dis-similar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Figure 1:
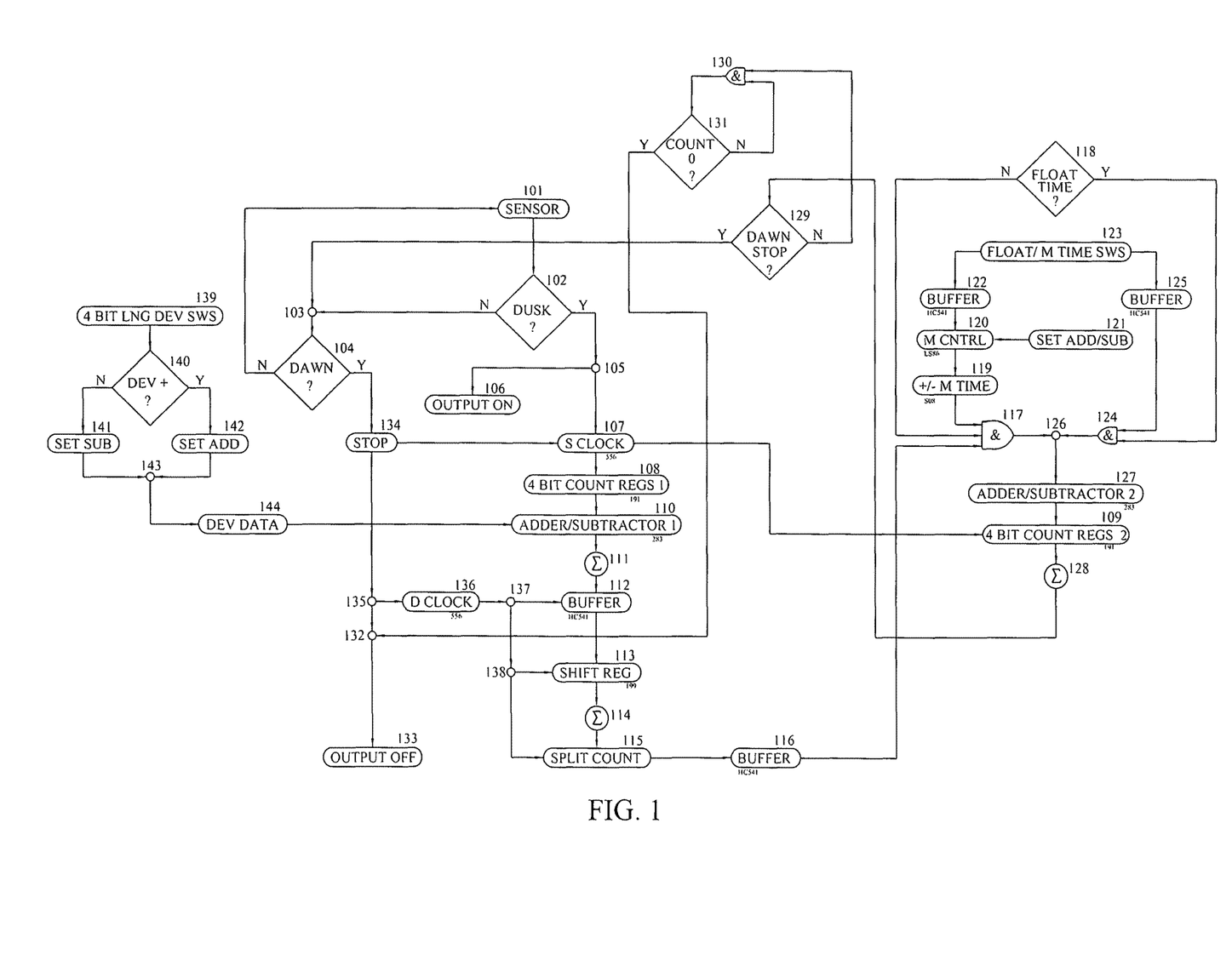
FIG. 1 Illustrates the sequential flow chart of the electronic circuits of the embodiment of the invention in FIG. 2.
Figure 2:
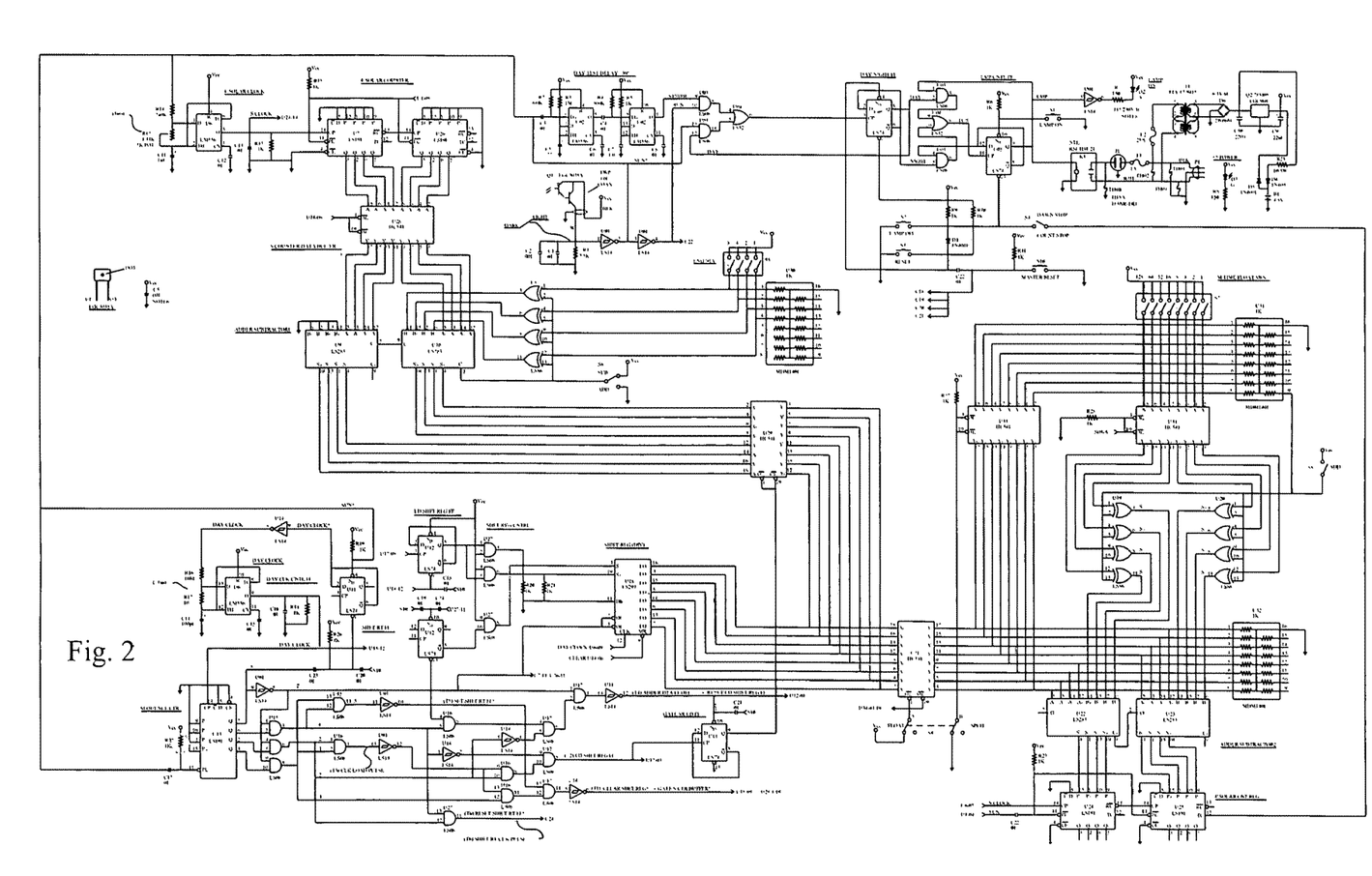
FIG. 2 Illustrates the entire schematic of the electronic circuits of one embodiment of the invention.
Figure 2A:
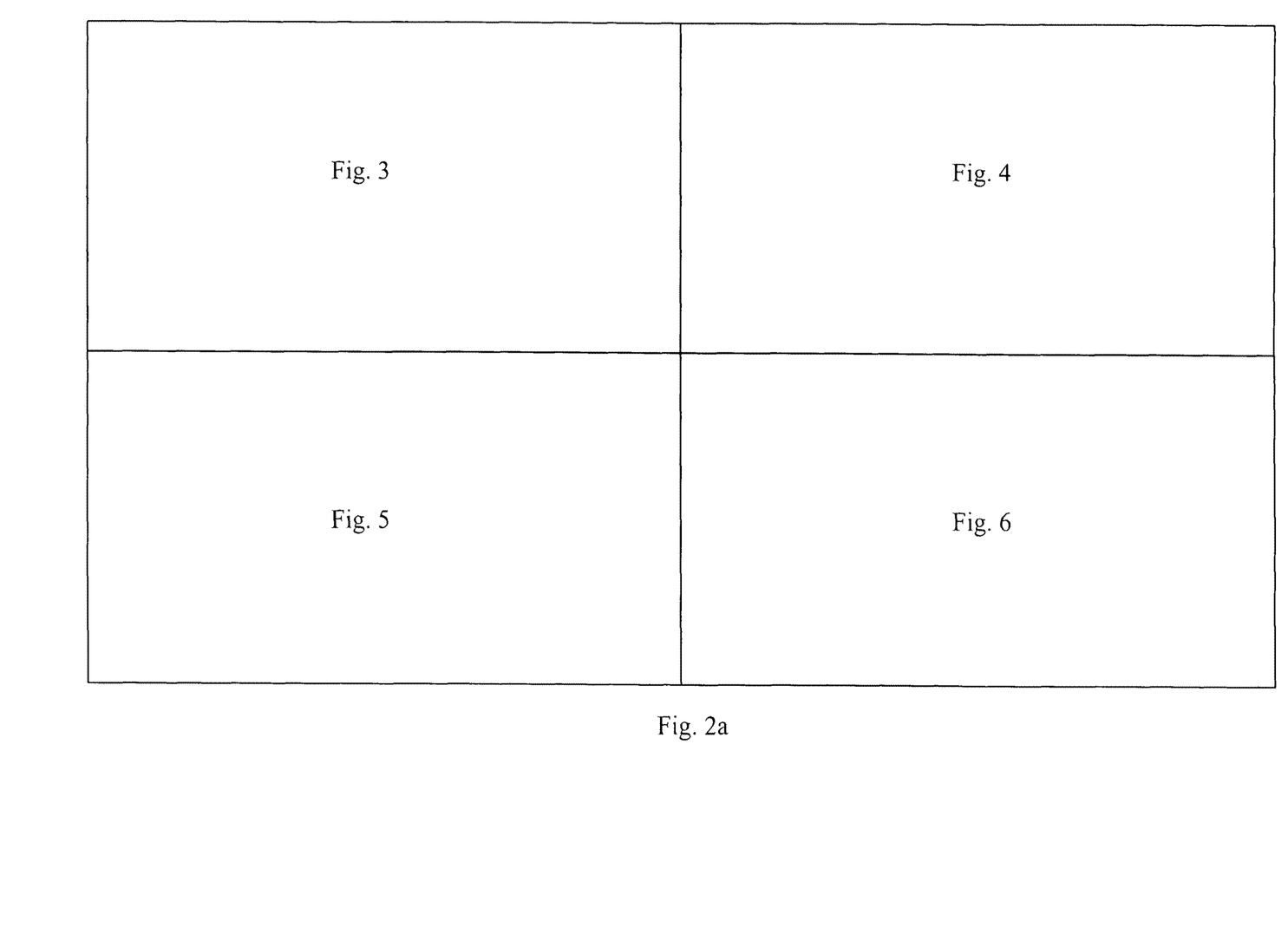
FIG. 2a Illustrates the four (4) quadrant arrangement of the embodiment described in FIG. 2.

FIG. 1 illustrates the logic flow of the embodiment of the invention described in FIG. 2 and referenced in FIG. 2a. Flow begins with cartouche 101, sensor, and flows to the question diamond (QD) 102, "dusk?" If "no," logic flows to the or node (ON) 103, thence to QD 104, "dawn?" If the result is "no," logic flows back to 101, sensor. If the result of QD 102 "dusk?" is "yes," the logic flow moves to the ON 105 and to 106, "output on," the signal sent to any and all security and annunciator devices driven by the invention. The flow from ON 105 also goes to 107, S Clock, which begins counting in four minute steps. The output of S Clock is fed to 108, the 4-bit Counter Registers 1 and 109, 4-bit Counter Registers 2. The logic flow from 108, 4-bit Counter Registers 1, is felt on 110, Adder/Subtracter 1. From there, logic flows through Summing Node (SN) 111 to buffer 112. From 112, logic flows to 113, the Shift Register. Output from 113 flows through SN 114 to the Split Count, 115, where the data is divided in half. The logic flow, in the form of digital data, moves from 115 to Buffer 116. Logic flow data from 116 appears on one leg of the tri-input AND logic 117. Buffer 116 data is gated through AND 117 by the other two (2) legs of 117. One is a signal from QD 118, "Float Time?" when "no." The other leg of 117 is activated by 119, "+/−M Time." The logic of 119, in turn, is directly influenced by 120, "M Control" The logic of 120, then, is dictated by the flow from 121, "Set ADD/SUB" and the buffer 122. Buffer 122 receives logic flow data from 123, "Float/M Time SWS." If QD 118 reveals a logical "yes," that logic flows to the two-legged AND, 124. The second leg of 124 is gated by the logic data that flows from buffer 125. The output logic from AND 124 is fed to ON 126. Note that the logic flow from AND 117 also arrives at ON 126. The flow from ON 126 is felt at 127, "Adder/Subtracter 2." The logic data flows from 127 to 109, "4-bit Counter Registers 2." The next point in the logic flow is SN 128, thence to QD 129, "Dawn Stop?" If the result is "No," the logic flows to 130, the two-legged AND; if "yes," thence to ON 103, and to QD 104, "Dawn?" The second leg of 130, AND, is gated by the logic line from QD 131, "Count 0?" with the result "no." If this circular feedback logic results in a "yes" at QD 131, the logic flows to ON 132, thence to 133, the "Output Off" command. Now revisit QD 104, "Dawn?" A "yes" result logic flows to 134, the "Stop" instruction. This halts 107, "S Clock," and flows through the ON, 135, to 136, the "D Clock," as well as logic flow through the ON, 132. The logic output from 136, the "D Clock" flows through the ON 137 to the Buffer 112 and the ON 138 to both the "Shift Register" 113 and 115, "Split Count." Note 139, "4-Bit Lng Dev SWS," whose logic flows to QD 140, "DEV+?" If the result from 139 is "no," the logic flows to 141, "Set Sub." If the result is "Yes," the logic flows to 142. The logic output from both 141 and 142 flow to ON 143, thence to 144, "Dev Data." This, then, flows to 110, "Adder/Subtracter 1."

As described above, FIGS. 3, 4, 5, and 6 illustrate the four quadrants, or divisions, of the complete electrical schematic of one embodiment of the invention as illustrated in FIG. 2 and referenced in FIG. 2a. Because of the size and complexity of the schematic, they are separated for the convenience of the reader to provide clearer readability and understanding. In the following detailed operational description, the logical flow of data, control and commands, will move unrestrictedly from figure to figure throughout the entire schematic, regardless of quadrant.

Figure 3:
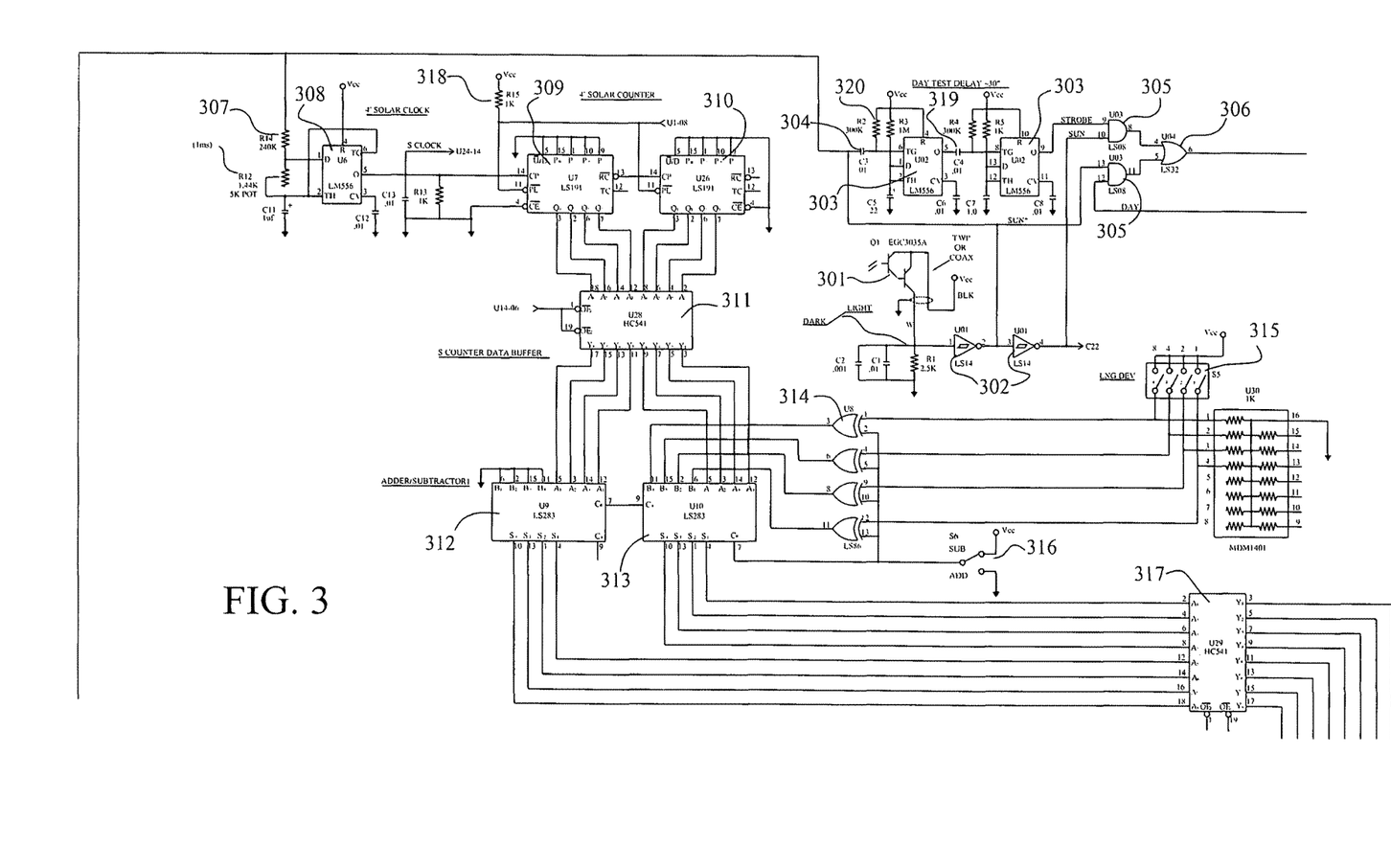
FIG. 3 Illustrates the upper left quadrant of the schematic of the electronic circuits of the embodiment of the invention illustrated in FIG. 2.
Figure 4:
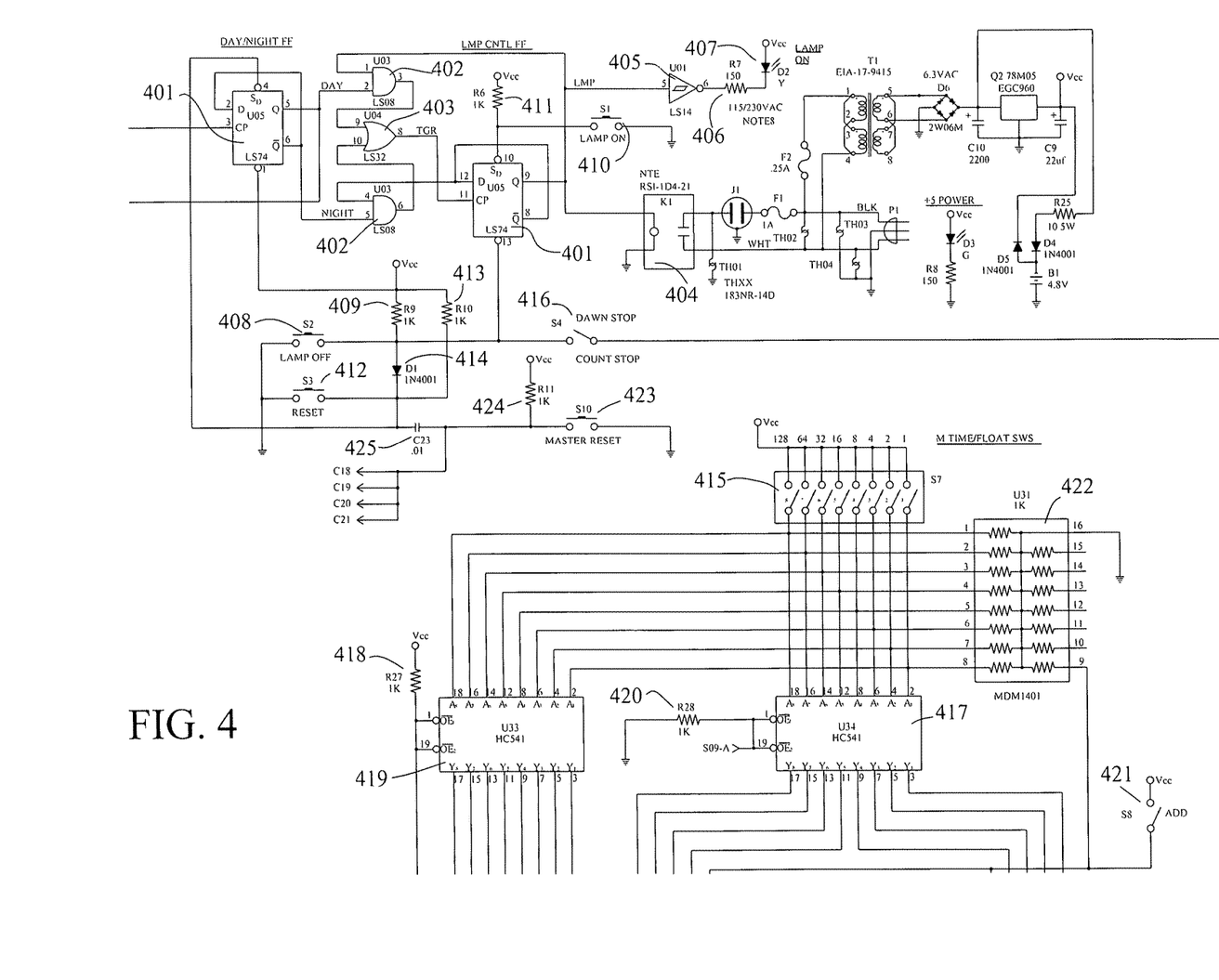
FIG. 4 Illustrates the upper right quadrant of the schematic of the electronic circuits of the embodiment of the invention illustrated in FIG. 2.

Although necessary for inclusion in the detailed description of the embodiment below, the elements 301, 302, 303, 304, 305, 306, 319, 320, 401, 402, 403, 404, 405, 406, and 407, called out in the description, along with their attendant circuitry, are excluded from this invention as a part of the application for patent, given that they have been covered and allowed under U.S. Pat. No. 6,680,877, Solar Night Splitter and Event Timer, issued Jan. 20, 2004.

The embodiment circuitry consists of roughly six (6) sections; Dusk-Dawn Sense, Day/Night Control, Dawn-Dusk Counter, Day Clock and Divider Sequence Control, and Output Control. The Power Supply section is ignored.

The embodiment described herein employs standard "off-the-shelf" electronic IC active and passive components. There is no reason to believe that the system could not be designed using more state-of-the-art computing devices driven by proprietary firmware, external sensors and controls.

External ambient solar light is sensed by the Darlington NPN photo transistor, Q1 (EQC3035A or Eq), 301. Without light, its falling output is fed to the Schmidt Inverter, U01 (74LS14), 302, to affect a rapid positive rise at output Pin 02 during signal change at the input, Pin 01. The sharp positive transition, SUN* ("Sun Not", i.e., no sunlight), appears at the input of a second Schmidt Inverter, Pin 03 of U01, 302, as well as the AC-buffered input of the first half of the timer circuit of U02 (LM556), 303, at capacitor C03, 304. SUN* also triggers three (3) other circuits which will be described below. At dusk, the output of this timer pair, Strobe, is blocked by the negative-going signal from U14 at Pin 10 of U03 (74LS08), 305, an AND circuit. It will be discussed later.

The positive-going signal from U01 Pin 02, SUN*, appears at Pin 13 of the dual AND circuit, U03 (74LS08), 305. Because Pin 12, Day, is positive, the output, Pin 11, goes positive, thus gating the AND circuit. The output at Pin 11 in turn appears at Pin 5 of U04, 306, a dual OR circuit (74LS32), thus driving its output, Pin 06 to go high. This signal is fed to the CP input, Pin 03, of the dual Flip-Flop (FF), U05 (74LS74), 401, the Day/Night FF. This FF then changes from Day to Night status on Pin 06 because of the positive-going signal on Pin 03.

The Night signal from Pin 06 of the Day/Night FF is fed to Pin 05 of the AND circuit U03 (74LS08), 402, as well as Pin 02 of U05, 401, to latch the FF. The AND circuit is gated on Pin 04 by LMP*(Lamp Not), the Day condition, thus allowing Pin 6 to go positive and gate Pin 10 of U04, 403, the OR circuit (74LS32), whose rising output, TGR, sets the Lamp Cntrl FF to the LMP condition on the output Pin 09 of U05, 401. This, in turn, drives the solid-state relay, K1 (NTE, RSI-1D4-21 or eq.), 404, "On," to gate premise AC power or other output circuitry. It is also felt on Pin 05 of U01, 405, the Schmidt Inverter, whose ground-level output is fed to the 150Ω voltage limiting resistor, R07, 406, thence to the LED, D02, 407, Lamp On. The output circuitry may be of any nature, depending upon the requirements of the premise and its owner-overseer. That might include FM signals transmitted over the premise AC power line to signal and thus control other output devices or other direct-control systems such as illumination, warning and intrusion devices.

The presence of switch S02, 408, Lamp Off, is to force a manual shut down of the output circuitry when "On," should that be required. When pressed, GND is imposed on the line to Pin 13 of U05, 401, the Lmp Cntl FF, which is held high by the 1 KΩ pull-up resistor R09, 409. This pulls the FF to the "Off" state. Likewise, switch S01, 410, between GND and Pin 10 of U05, 401, held high by 1 KΩ pull-up resistor R06, 411, will pull the FF to the LMP, or output "On" state; should that be desired. Manual Reset, S03, 412, is isolated from the Lamp Offline from S02, 408, by diode D01 (1N4001), 414. When pressed, this will cause a Reset of the Day/Night circuitry, thus pulling the Day/Night FF to its Reset state via U05 Pin 04, 401, as well as Lmp Cntl FF via D01, 414.

Figure 5:
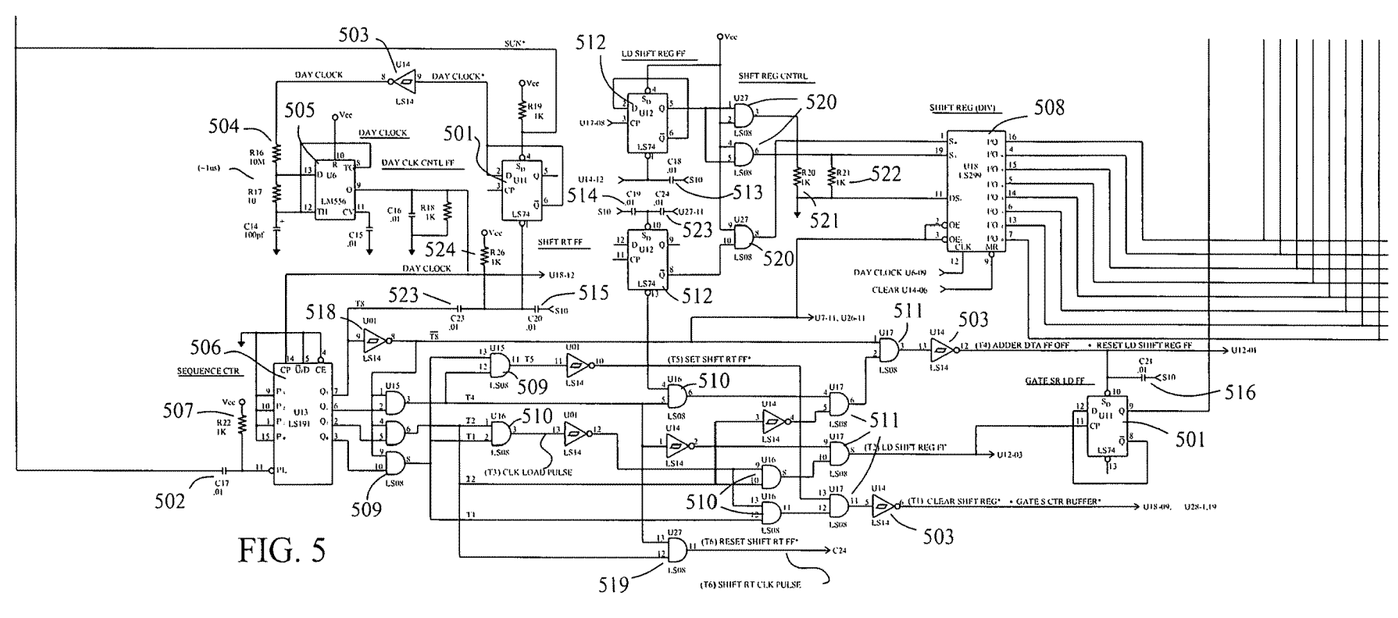
FIG. 5 Illustrates the lower left quadrant of the schematic of the electronic circuits of the embodiment of the invention in FIG. 2.
Figure 6:
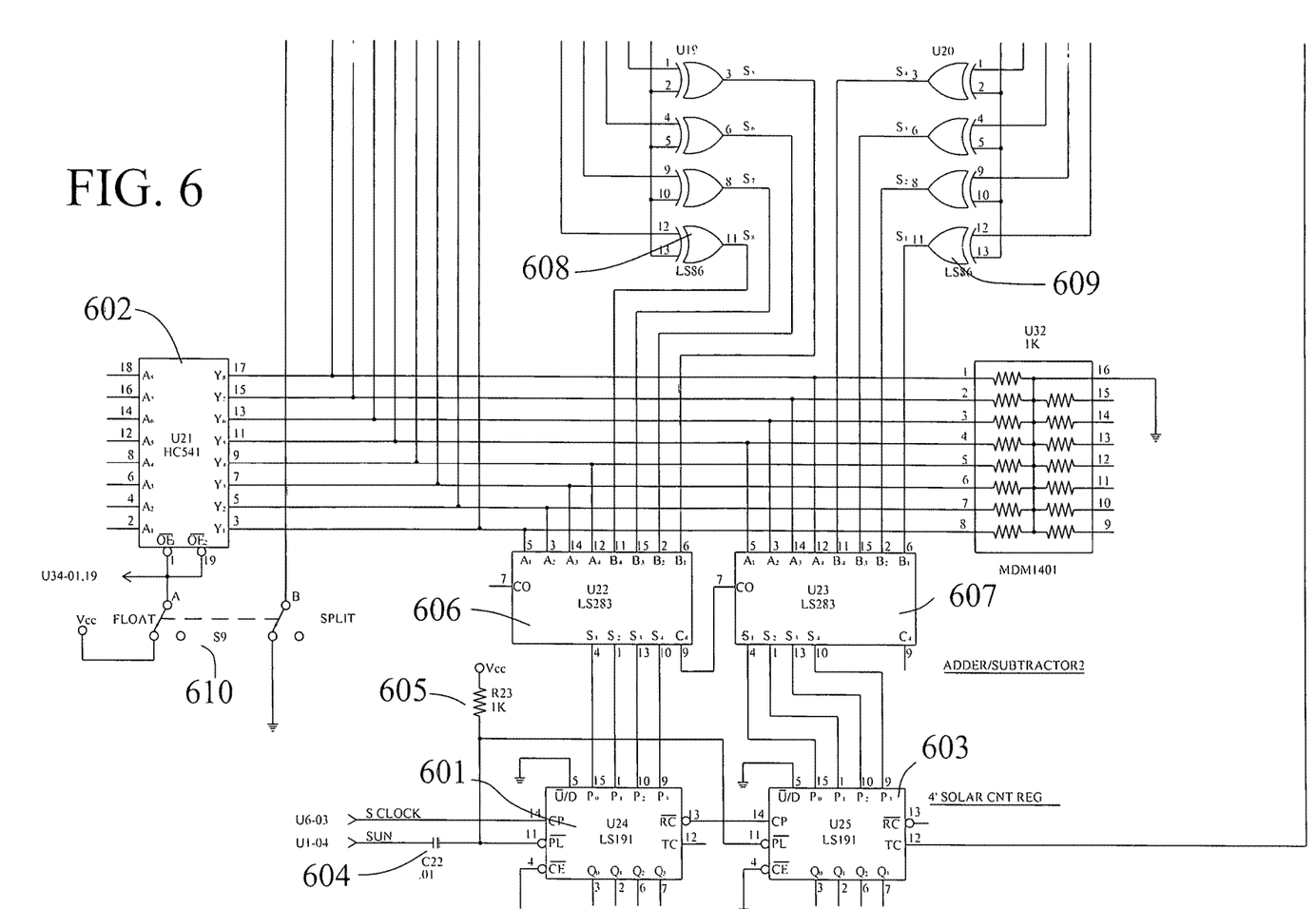
FIG. 6 Illustrates the lower right quadrant of the schematic of the electronic circuits of the embodiment of the invention in FIG. 2.
Figure 7:
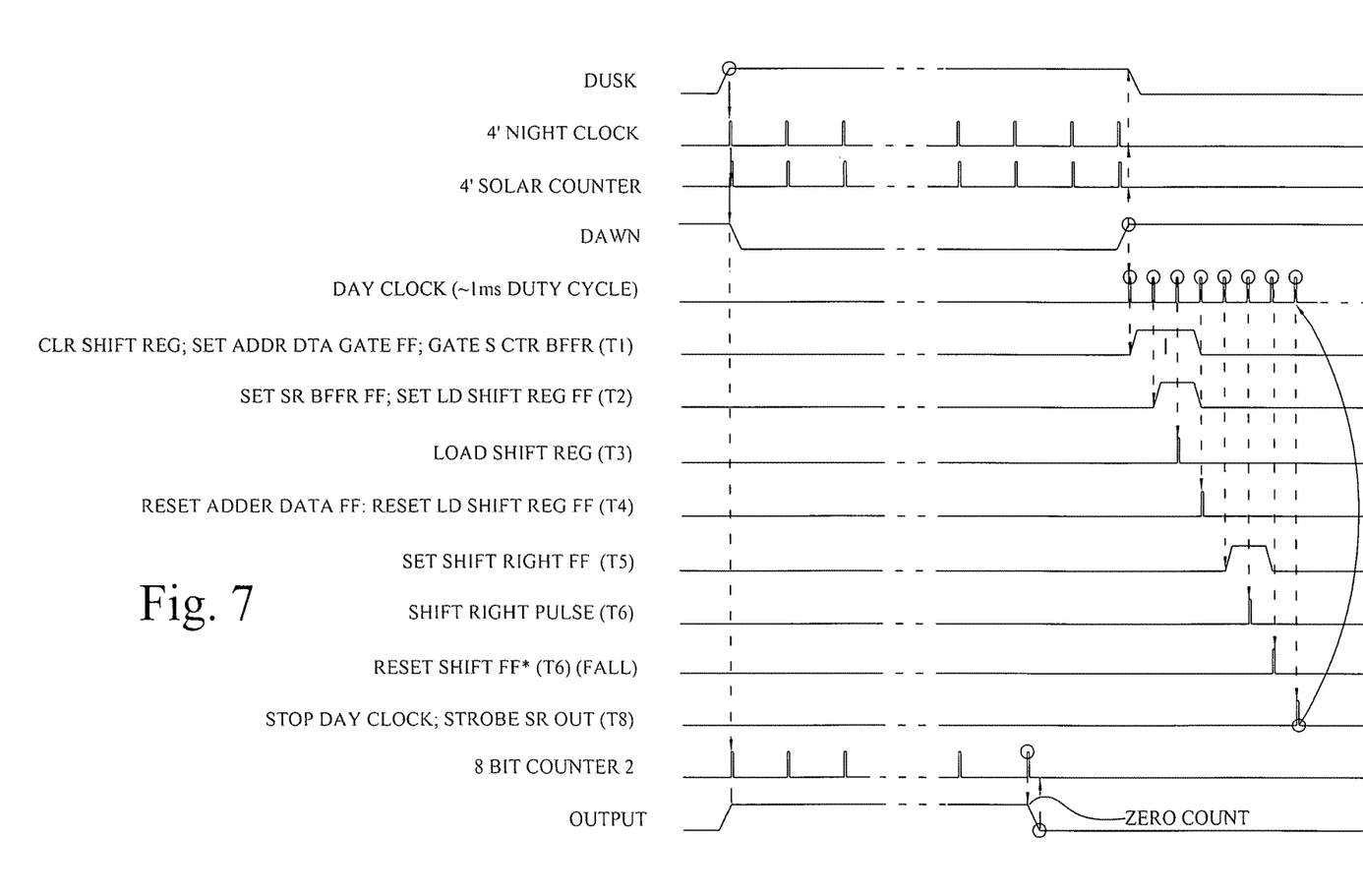
FIG. 7 Illustrates the timing chart of the schematic of the electronic circuits of the embodiment of the invention in FIG. 2.
Figure 8:
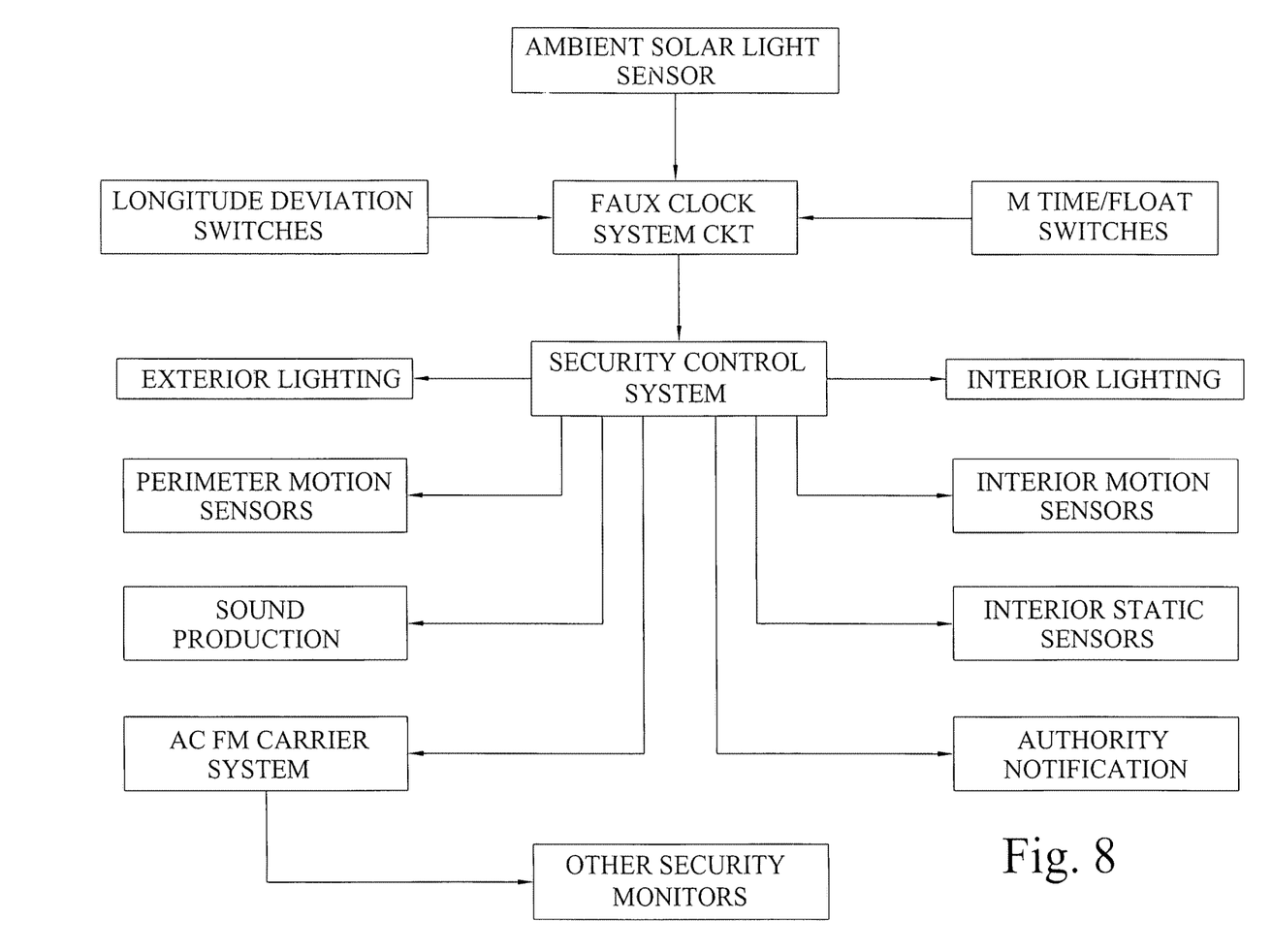
FIG. 8 Illustrates the potential uses of any embodiment of the invention in FIG. 2.

At dusk, SUN* will be high, or positive (+5 VDC), as it comes from Pin 02 of U01, 302, the Schmidt Inverter, and is dot-ored with C03, 304, R14, 307, U11 Pin 04, 501, and C17, 502. Only U06, 308, the 4' Solar Clock (LM556) oscillator, is affected at this time (dusk). The high appears on R14, 307, the 240 KΩ resistor, one half of the voltage divider that triggers U06, 308, the 4' timer oscillator. Pin 03 of U06, 308, emits a ~1 ms positive-going square wave, S Clock, every 4 minutes until the fall of SUN* at dawn. S Clock appears on Pin 14 of the first of two (2) 4-bit binary counters, 4' Solar Counter, U07, 309. The signal S Clock also goes to U24 (74LS191), 601, Pin 14 (TBD). The outputs of the two counters, $Q_1$-$Q_4$, U07, 309, and U27, 310, (74LS191s) are fed to the octal buffer, U28 (HC541), 311, there held to await transfer. The output of the buffer appears at the inputs of the pair of 4-bit binary adders, Adder/Subtracter 1, U09, 312, and U10, 313, (74LS283s), $A_1$-$A_4$. At the same time, the outputs of U08, 314, a quad exclusive or (74LS86), are present at the low-order bits of the Adder/Subtracter, U10, 313, (74LS283), Adder/Subtracter 1. The four EOR circuits are influenced by the four (4) binary switches S05, 315, labeled Lng Dev, for "Longitudinal Deviation." In turn, these are controlled by the Sub or Add Switch S06, 316, which determines whether the deviation will be added to, or subtracted from, the 4 minute clock count. During the dusk to dawn period, the cumulative data from U09, 312, and U10, 313, appears on the input Pins, $A_n$ of the buffer U29 (HC541), 317, to be held for Day Clock operations.

At dawn, the output of the sensor, Q01, 301, transitions to positive, or high. This results in the shift of the signal on Pin 02 of U01, 302, SUN*, to go low, or GND level. This is felt by capacitor C03, 304, whose output line goes to U02 Pin 06, 303, normally held high by pullup resistor R02, 320. The negative-going AC edge from the capacitor drives Pin 06, TG, of U02 (LM556), 303, the input timer of the dual timer, Day Test Delay~30", the 30-second delay circuit, with a negative spike. The negative-going square wave at output Pin 05 of U02, 303, is felt as a negative pulse developed across capacitor C04, 319. This, in turn, starts the second half of the dual timer. The output at Pin 09, Strobe, falls to GND for ~30 seconds, thus de-gating the dual AND circuit U03 (74LS08), 305, on Pin 09. This blocks the conditioning signal from U01 Pin 04, 302, SUN, which has risen high (the purpose of this delay circuit is to prevent a false dawn during the dusk-to-dawn period from spurious light changing the state of Q01, 301, the sensor, leading to the dawn status). At the end of the 30 second delay, the output of the dual AND, 305, at Pin 8 pops high. This is fed to Pin 04 of U04, 306, the dual OR circuit. Its output on Pin 6 appears at the CP pin, 3, of the Day/Night FF, U05, 401. This shifts the FF to the day condition with the rise on Pin 5 and the fall of Pin 06. If system output has not been completed, i.e., stopped, during the dusk-to-dawn period by other means, the signal DAY will be combined with LMP at input Pins 1 and 2 of the dual AND, U03 (74LS08), 402. The output at Pin 03 is felt at input Pin 09 of the dual OR circuit U04 (74LS32), 403, whose output at Pin 08, TGR, is fed to the CP pin, 11, of U05 (74LS74), 401, the Lmp Cntl FF. The signal at Pin 09 will fall, resulting in the collapse of power to the relay, K01, 404, and the LED driver at U01 (74LS14) Pin 06, 405. If the output status has changed, i.e., stopped, before dawn, the line labeled LMP will be negative, or down. This will block the gating of the dual AND at U03, Pin 01, 402, thus disallowing the change in status of the Lmp Cntl FF.

At the same time, with the arrival of dawn and the fall of SUN*, the 4' Solar Clock oscillator, 308, will stop, and the 4' Solar Clock will cease counting. The Day Clk Cntl FF, U11 (74LS74), 501, is pulled over at Pin 04, such that Pin 06, Q*, falls, causing Pin 08 of the inverter, U14, 503, to rise, thus feeding a high to resistor R16, 504, thence Pin 13 of U06 (LM556), 505, the Day Clock. This circuit will begin issuing ~1 μs square wave pulses every ~1 ms to drive the sequence control circuitry. SUN* is also felt on capacitor C17, 502. The resulting negative-going AC pulse from this capacitor is felt on Pin 11 of U13 (74LS191), 506, PL, the load pin of the four-bit sequence counter, which is normally held high with pull-up resistor R22, 507, to Vcc. This action loads all zeroes into the counter, an effective reset, given that the input, P pins, are pulled to GND.

Day Clock pulses are felt on Pin 14, CP, of U13 (74LS191), 506, the 4-bit counter, which causes a binary count-up sequence, 1 through 256 (although in this case only the first 8 pulses are employed). The output pulses from the counter drive the sequencer matrix. The counter stops with the fall of bit 8, which changes the status of the Day Clk Cntl FF, U11, 501, Pin 01 (TBD).

The D Clock sequencer matrix is designed to control data flow from the 4' Solar Clock, through Adder/Subtracter 1, thence to the buffer U29 (HC541), 317, then the shift register, U18 (74LS299), 508, input/output bus, and to the buffer U21 (HC541, 602.

With the first positive-going pulse from the Day Clock (T1), the sequencer circuit, comprised of dual input AND circuits U15, 509. U16, 510, U17, 511, and U27, 519 (all 74LS08), and Schmidt Invertors U01, 518, and U14, 503 (74LS14s), the line (T1) CLEAR SHIFT REG*•GATE S CTR BUFFER* is brought low on Pin 06 of U14, 503. This signal is felt on Pin 09 of U18 (74LS299), 508, the Shift Reg (Divider), MR (master reset), which serves to clear the contents of the register from the last solar cycle count. This same signal is fed to Pins 01 and 19 of octal buffer U28 (HC541), 311, $OE_1$* and $OE_2$*, the output enable pins, which transfers the count data from the 4' Solar Counter to the $A_n$ Pins of U09, 312, and U10, 313 (74LS283s), Adder/Subtracter 1. They are merged with the outputs of the quad exclusive OR circuits of U08 (74LS86), 314, at the $B_n$ data input pins. Whether the Lng Dev (Longitudinal Deviation) data is added to, or subtracted from, the S Counter Data Buffer, is determined by the setting of switch S06 (SPDT), 316, the Add/Sub switch. With this switch in the positive, or high (Vcc) position, data from switch S05, 315, will be subtracted from the Solar Counter result; when in the GND, or low, position, the switch data will be added.

The second pulse of the Day Clock (T2), via the positive-going line from U17 (74LS08), 511, Pin 08, toggles the Ld Shift Reg FF, U12 (74LS74), 512, Pin 03, CP, high to pull Q, Pin 05, of the FF high as well. That, in turn, gates the two AND circuits at U27 (74LS08), 520, Pins 01 & 05, one-half of which are held high constantly, on Pins 01 and 04, to overcome the pull-down resistors, R20, 521, and R21, 522, and energize Pins 01 and 19 of U18 (74LS299), 508, $S_0$ and $S_1$. These control inputs gate the loading of the shift register data from the buffer, U29, 317, on the next clock cycle. This (T2) signal also goes to Pin 11, CP, of U11 (74LS74), 501, the Gate SR LD FF. That causes the line from Pin 09 of that device to go low, and is felt on Pins 01 and 19 of U29 (HC5412), 317, $OE_1$* and $OE_2$*, the output enable pins of the buffer, which effect the transfer of the output data bus from Adder/Subtracter 1, the last 4 minute count to the shift register.

Day Clock pulses are felt on Pin 12, Clk, of U18 (74LS299), 508, the Shift Register. At (T3) time, given that this device has been gated to receive input data on its $I/O_n$ pins, data held by the buffer, U29, 317, which have been output to the octal bus, will load into the shift register.

At (T4) time of the Day Clock, Pin 12 of the inverter U14 (74LS14), 503, will fall. Labeled (T4) Adder Dta FF Off•Reset Ld Shift Reg FF, this line appears on Pin 10 of the Gate SR LD FF, U11 (74LS74), 501, as well as Pin 01 of U12 (74LS74), 512, the Ld Shift Reg FF. It can be seen that this action will de-gate the Shift Register Pins 01 and 19 and cause Pin 09 of U11, 501, to go positive to de-gate the buffer U29, 317.

At Day Clock (T5) time, the (T5) Set Shft Rt FF* line goes LOW and is felt on Pin 13 of U12 (74LS74), 512, the Shft Rt FF flip-flop. This, in turn, causes Pin 08, Q*, of that circuit to rise. This is felt on the pre-gated AND circuit U27 (74LS08), 520, Pin 10, which is DOT-ORed with Pin 03 of U27, 520, and causes Pin 01 of U18, $S_0$, of the Shift Register, 508, to go positive in preparation for the circuit to shift the on-board data to the right.

At (T6) time of the Day Clock, the clock pulse felt on Pin 12 of the Shift Register, 508, the data to the right one bit position, thus effectively dividing the data contained therein in half. To prevent a timing race, in which the following clock pulse (T7) would cause a second shift right, clock pulse (T6) is fed to capacitor C24, 523, whose output is DOT-ORed with C19, 514, to present the negative-going AC transition of (T6) at Pin 10 of U12, (74LS74), 512, the Shft Rt FF. This serves to pull Pin 08, Q*, of the FF low, thus de-gating Pin 10 of U27, 520, and subsequently Pin 01, $S_0$, of U18 (74LS299), 508, the Shift Register.

With the final Day Clock pulse, (T8), the data from the Shift Register, 508, on the I/O$_n$ pins of that device are loaded onto the Octal Output lines and are available to the buffer U21 (HC541), 602, on its input pins $A_n$. This is accomplished by the fall of Pin 08 of the inverter U01 (74LS14), 518. The line 8*, low, is fed to Pin 11, PL*, on U07, 309, and U26, 310, (74LS191s), the 4' Solar Counter, where it overcomes the pullup resistor R15, 318, to load the Counter with all zeroes on the $P_n$ pins in preparation for the subsequent Dusk to Dawn cycle. At the same time, 8* appears on Pins 2 and 3, $OE_1$ and $OE_2$, the Output Enable pins of U18, 508. The (T8) pulse also appears on the input side of isolation capacitor C23, 523. The negative-going AC pulse overcomes the high held by the pullup resistor R26, 524, to pull Pin 01 of U11 (74LS74), 501, the Day Clk Cntl FF down. When it falls, Pin 06, Q* is pulled up. This, in turn, causes the output pin 08 of the inverter U14 (74LS14), 503, Pin 08 to fall, thus ending the Vcc supply to the Day Clock Counter, U06 (LM556), 505, and ending the Day Clock Count.

At dusk, Pin 04 of U01 (74LS14), 302, SUN, falls. Its purpose which affects Day/Night control as discussed above, also includes loading of data into the 4' Solar Cnt Reg Counter, comprised of U24, 601, and U25, 603, (74LS191s). This signal is passed through capacitor C22, 604, to pull Pin 11 of U24, 601, and U25, 603, PL*, down, past the pullup resistor R23, 605. The data is from Adder/Subtracter 2, U22, 606, and U23, 607, (74LS283s). In turn, the input data available to these circuits are from one of two (2) sources; the buffer U21, 602, (HC541), or the exclusive OR circuits, U19, 608, and U20, 609, (74LS86s), which are fed by the M Time/Float SWS, S07, 415, (Octal DIP). With the energizing of the 4' Solar Clock, S Clock pulses are sent from U06 (LM556), 308, Pin 05, to Pin 14, CP, of U24, 601. These pulses will continue through the Dusk to Dawn period to count down the 4' Solar Cnt Reg to zero for this feature when employed. The output pin of U25, 603, Pin 12, fires a negative-going signal to S04, 416, the Dawn Stop–Count Stop switch. If this switch is open, the system output will cease at dawn as dictated by the Day/Night circuitry. If switch S04, 416, is closed, the signal from U25, 603, Pin 12 will dictate the Output Stop event. It should be obvious that if the S Clock pulses cease before the Solar Count Register has dropped to zero, a rare occurrence, the output circuitry will be stopped by the automatic dawn condition, and the four-minute count register, 601 and 603, will be reset to zero by the SUN pulse via C22, 604.

If switch S09, 610, (DPDT), the Float–Split switch is in the Float position, a high (Vcc) will appear on Pins 01 and 19 of the buffer U21, 602, (HC541), via the A portion of the switch, data held by the buffer will not be present on the output Pins $Y_n$. At the same time, this signal also appears on Pins 01 and 19, $OE_1$ and $OE_2$, at the junction with pulldown resistor, 420, of the buffer U34, 417, (HC541), thus preventing the output of the switches in S07, 415, the M Time/Float SWS from appearing at the inputs of the exclusive OR circuits of U19, 608, and U20, 609, (74LS86s). At the same time, the line from the B position of S09, 610, will be pulled low over the influence of the pullup resistor R27, 418, to allow the output of the switches in S07, 415, to be felt on the Octal bus from U33, 419, (HC541), that feeds Adder/Sub-Tracter 2, U22, 606, & U23, 607 (LS283s). These data will flow through the Adder/Subtracter circuits to the 4' Solar Cnt Reg, where S Clock pulses cause the count down to zero, resulting in the fall of Pin 12 of U25, 603, (74LS191). As described above, this negative-going pulse flows through the Dawn Stop–Count Stop switch, S04, 416, (SPST) (assuming it is in the closed, or Count Stop position) to Pin 13 of U05, 401, (74LS74), the Lmp Cntl FF. That results in the rise of Pin 08, Q*, and the fall of Pin 09, Q, LMP, thus an effective Master Reset. This condition dictates that the system output will cease at the designated amount of time after the Dusk Output On moment, or "Float" for a specified time after dusk unrelated to midnight or UCT.

When switch S09, 610, is in the Split position, the B pole allows a high on the Output Enable* pins Pins 01 and 19 of U33, 419, as dictated by pullup resistor R27, 418; while the A pole of S09, 610, transitions low, pulled to GND by the pulldown resistor R28, 420. This is felt on Pins 01 and 19, $OE_1$ and $OE_2$, of buffers U21, 602, and U34, 417, (HC541s). As a result, the data from buffer U34, 417, appears on the $Y_n$ output pins, as well as the input, B, pins of U19, 608, and U20, 609, (74LS86s). At the same time, the $Y_n$ data from U21, 602, are felt on the $A_n$ pins of U22, 606, and U23, 607, Adder/Subtracter 2. These data are from the previous dusk to dawn count. The resulting data from the output pins of U19, 608, and U20, 609, are also fed to the $B_n$ pins of U22, 606, and U23, 607, (74LS283s), Adder/Subtracter 2. The B pin data is added to, or subtracted from, the A pin data depending upon the polarity of switch S08, 421, the Add Switch. The polarity of this switch is normally held low by the pulldown resistor, Pin 09 of U31, 422, a 1K resistor array. In this condition, data from the M Time/Float SWS, S07, 415, will be added to the Solar Count data. When S08, 421, is in the closed position, a high is placed on the exclusive OR circuits, and M/Float data will be subtracted from the Solar Count. Under these conditions, the Output Stop Time control will more resemble a clock time reflected under the UCT regime. Again, the Stop Time will be dependent upon the zero-time fall of U25, 603, Pin 12, TC (Terminal Count), whose signal flows through S04, 416, in the Count Stop position.

With initial Power On of the system, S10, 423, the Master Reset switch, is used to overcome the pullup resistor R11, 424, to cause its output pin to go to GND. This is fed to five (5) capacitors, C18, 513, C19, 514, C20, 515, C21, 516, and C23, 425. The negative-going AC signal from the output of these capacitors are fed to the Flip-Flops U05, 401, U11, 501, and U12, 512, to ensure the correct quiescent state at Power On time.

What is claimed is:

1. A faux clock device comprising an electronic device and system which employs a light sensor and electronic circuits to measure a division of a solar day between day and night, estimate approximate midnight based upon a longitudinal location of said device and system, and uses data derived from the light sensor, longitudinal data, and variable data control switches to cause an output of said device and system to control local, remote, interior and exterior, devices and systems for security, surveillance and annunciator purposes not a part of said faux clock system, rather external to it.

2. The faux clock device of claim 1 in which solar light-dark data causes an oscillator to count a passage of time during a dusk-to-dawn phase in four-minute steps, comprising: a) a digital oscillator; b) two (2) four-bit counters; c) an octal buffer to store such counter data;
wherein about 1 ms wide count pulse every four (4) minutes from the oscillator cause the dual four-bit counters to add up dusk-to-dawn pulses, and from which resulting data is stored in the octal buffer for later use.

3. The faux clock device of claim 1 in which octal dusk-to-dawn four-minute count data is added to, or subtracted from, longitudinal offset data and is buffered for later use, comprising: a) a pair of four-bit adders in lieu of an octal adder; b) an exclusive OR circuit; c) a four-bit switch; d) a Single-Pole, Double-Throw switch; e) an octal buffer; wherein dusk-to-dawn data is present in four-bit adders combined to comprise a single octal adder, in which data from a four-bit longitudinal deviation switch is fed to exclusive OR circuits, and in turn are added to, or subtracted from, a result in the adders determined, as a result of a setting of the Single-Pole, Double-Throw switch, which determines whether to add or subtract longitudinal deviation data from the four-bit longitudinal deviation switches, and resulting data from said adders is stored in an octal buffer for later use.

4. The faux clock device of claim 1 in which data from adders in which four-minute dusk-to-dawn data has been added to, or subtracted from, data from longitudinal deviation switches, and is divided in half comprising: a) two (2) octal buffers; b) an octal shift register; c) a four-bit counter; d) a digital oscillator; e) four (4) control flip-flops; f) a sequencing matrix; wherein a digital oscillator drives a four-bit counter, which drives a sequencing matrix comprised of AND circuits and invertors, which control the synchronous loading of longitudinal deviation data added to or subtracted from dusk-to dawn octal adder data onto an octal tri-state bus, loaded onto an octal shift register where it is divided in half to determine approximate midnight of the previous dusk-to-dawn period; this data is then loaded onto the tri-state octal bus and onto an octal buffer to await further use.

5. The faux clock device of claim 1 in which the output of the device and system is determined by comprising: a) Three (3) octal buffers; b) Two (2) four-bit OR circuits; c) Two (2) four-bit adders; d) Two (2) four-bit counters; e) An octal switch array; f) Two (2) Single-Pole, Single-Throw switches; g) A Double-Pole, Double-Throw switch; wherein a Double-Pole, Double-Throw switch, that indicates Float (Floating output time from dusk) condition or Split (Dusk-to-Dawn split; output time based upon calculated midnight), determines whether half-time data developed during a previous dusk-to-dawn period, added to or subtracted from switch data contained in an octal array switch, or solely by said array switch data, is used to determine the device and system output duration, and wherein under Float condition, data from said switch array, is fed via an octal bus through an octal buffer directly to a pair of four-bit adders whose octal output is fed into a pair of four-bit count-down counters whose count is driven by S-Clock (Solar Clock) pulses during a dawn-to-dusk period; or under Split condition, in which M-Time (Midnight Time), the contents of a buffer whose data source is half data from a previous dusk-to-dawn period added to or subtracted from longitudinal deviation data, is added to said M-Time data through the use of an octal buffer, a pair of exclusive OR circuits to control the add or subtract function switch array data with M-Time data, the aforesaid adders and counters, and where, in both cases, the output signal from the counters is sent to an Single-Pole, Single-Throw switch, Dawn Stop/Count Stop, to determine if that signal is to be used to terminate the device and system output during the dusk-to-dawn period or terminate at dawn, thus ignoring the dusk-to-dawn count and control within the device and system.

* * * * *